United States Patent [19]
Hall

[11] 4,023,018
[45] May 10, 1977

[54] NAVIGATION SYSTEM AND METHOD

[76] Inventor: David J. Hall, 18104 Lovell Road, Spring Lake, Mich. 49456

[22] Filed: July 15, 1975

[21] Appl. No.: 596,183

[52] U.S. Cl. .................. 235/150.27; 33/363 K; 73/178 R; 114/144 E; 180/79.1; 235/61 NV
[51] Int. Cl.² .................. G01S 7/44; B63H 25/00
[58] Field of Search ............ 235/150.27, 150.26, 235/150.2, 150.5, 150.25, 189, 61 NV; 35/10.2; 73/178 R, 178 T; 340/27 NA; 250/211 R, 231 SE, 200, 237, 233; 114/144 E, 144 B; 318/640, 587, 588, 577, 603, 580, 585; 33/321, 363 K; 244/3.2, 77 R, 77 B, 175; 74/5.34, 5; 180/79.1; 343/5 R

[56] References Cited

UNITED STATES PATENTS

| | | | |
|---|---|---|---|
| 1,337,737 | 4/1920 | Van Der Bijl | 250/233 |
| 2,651,842 | 9/1953 | Otto, Jr. | 235/61 NV |
| 2,740,583 | 4/1956 | Holden | 235/189 |
| 2,813,460 | 11/1957 | Wallin | 250/233 |
| 2,939,128 | 5/1960 | Arkus | 343/5 R |
| 2,995,318 | 8/1961 | Cocharo | 235/150.25 |
| 3,368,065 | 2/1968 | Kendall | 73/178 T |
| 3,454,777 | 7/1969 | Marcus | 250/237 |
| 3,749,893 | 7/1973 | Hileman | 235/150.27 |
| 3,772,503 | 11/1973 | Fowler | 235/150.5 |
| 3,875,405 | 4/1975 | Ferguson | 235/150.27 |

OTHER PUBLICATIONS

Strother, J. A.; "Angular Position Sensor", RCA Technical Notes, TN No. 834, p. 1; May, 1969.

*Primary Examiner*—Malcolm A. Morrison
*Assistant Examiner*—Errol A. Krass
*Attorney, Agent, or Firm*—McGarry & Waters

[57] ABSTRACT

A coordinate indicating and plotting system wherein compass heading signals are periodically integrated at frequencies related to the distance traveled by a water, air or land vehicle to obtain coordinate change signals for visual indication of vehicle coordinates. The coordinate change signals can be applied to a plotting system to record the path followed by the vehicle or applied to a counter to indicate the unit changes for the vehicle in each direction. Desirably, the compass heading signals are digitized by converting the heading signals into frequencies and the signals are integrated by summing the pulses for each output direction during each sampling period. A novel crescent-shaped opening whose width approximately follows a sine function between zero and 180° is positioned angularly on the compass card about the center of rotation thereof. Linear light sources on one side of the card and photometric detectors positioned in alignment with the light sources on the other side of the card measure the light passing through the crescent-shaped opening to produce signals representative of the heading components of the vehicle in each direction.

12 Claims, 11 Drawing Figures

NAVIGATION SYSTEM AND METHOD

BACKGROUND OF THE INVENTION

1. Field of the Invention

This invention relates to navigation systems. In one of its aspects, the invention relates to a navigation system in which compass headings are continuously integrated with distance traveled by a water, air or land vehicle to give coordinate position output readings for the vehicle. In another of its aspects, the invention relates to a method for continuously determining position coordinates of a water, air or land vehicle with respect to known positions.

2. State of the Prior Art

It is desirbale and necessary to accurately determine the coordinate position of water and other types of craft. Systems of coordinate plotting by manual calculations are complicated and time consuming. It is desirable to obtain an instantaneous reading of position with respect to fixed known coordinates.

Many compass systems have been developed for maintaining craft on predetermined courses. For example, see U.S. Pat. Nos. to Fowler, 3,772,503, Chance, 2,102,511, and 2,463,245, Best, 2,370,000, Hill, 1,885,098, Helmer, 1,834,399, Smola, 2,063,765 and 2,204,553, and Schulte, 2,518,258. Many of these devices use photocells to detect deviation from a desired heading. The Fowler patent, 3,772,503, discloses a compass card coated with magnetic or light transmissive and opaque segments. The coated information in detected by sensors to produce a digital signal representative of the compass card position with respect to the housing.

Another compass system in which an output heading signal is produced is disclosed in the U.S. Pat. No. to Barbieri et al., 3,480,788. In this system a compass with a photopotentiometer has an output signal representative of the compass heading.

A course plotter for a boat is disclosed in the U.S. Pat. No. to Gray, 3,141,725. In the Gray system a signal representative of a compass heading is integrated with a signal representative of the velocity of the vehicle. The integrated signal is resolved into north-south and east-west components and plotted on a chart.

The Gray system is fairly expensive in that it requires expensive and complicated heading detectors and gear train equipment. Further, the system has inherent compass drag due to the compass drive potentiometer system. Further, the Gray system is difficult to calibrate for magnetic deviation due to the craft in which it is mounted.

SUMMARY OF THE INVENTION

According to the invention, a navigation system for determining the position of an air, land or water vehicle with respect to a given set of coordinates has means for measuring the heading of the craft with respect to at least two intersecting directions and for generating output signals representative of the vehicle heading in each of the two directions. Each of these signals is integrated during sample periods at times determined by the distance which the vehicle travels. A directional pulse signal is produced for each of the integrated signals each time the sum of the integrated signals reaches a predetermined value. The directional pulse signals are applied to visual indicator means for indicating the position of the vehicle with respect to a given set of coordinates. Desirably, a distance measuring means measures the distance traveled by the vehicle and gates the heading signals from the heading measuring means each time the vehicle travels a predetermined distance. In a preferred embodiment of the invention, the heading signals are converted to a frequency representative of the heading and the frequency pulses are summed or counted during the sampling period to produce a directional command signal for the visual indicator means.

First and second directional command signals are applied to counting means in the visual indicator to count the number of command signals in each direction. The counting means may be integrated into a plotter so that each command signal moves the plotter in a given direction one unit. Alternately, the counting means can be integrated into a display unit for indicating the position as a function of numerical direction coordinates.

Desirably, the magnetic measuring means includes a magnetic compass card responsive to the magnetic field of the earth and having a crescent-shaped opening angularly disposed about the center of rotation of the card. The width of the opening generally follows a sine function between 0° and 180° and desirably is so shaped to compensate for nonlinearities of various components of the heading measuring means so that the output signals therefrom are a function of the cosine of the angle between the craft heading and each of two mutually perpendicular directions. Linear light sources are positioned on one side of the plane of the card with the light sources being spaced at 90° from each other and radially disposed about the axis of rotation of the compass card in alignment with the crescent-shaped opening in the compass card. Photometric detecting means are positioned on an opposite side of the plane of the compass card from the light source. Each of the photometric detecting means is aligned with one of the light sources to detect light therefrom when the crescent-shaped opening is therebetween. Desirably, there are four light sources and four photometric detecting means, each of which light sources and photometic detecting means is spaced 90° about the axis of rotation of the compass card.

The system provides a simple and inexpensive mechanism for accurately plotting the course of a craft or vehicle from a given set of coordinates. Further, the power requirements for the system are low and the compass drag is substantially avoided. The use of the light bars and photometric detecting means provides a means by which each system can be easily and quickly compensated for magnetic deviations of the craft in which the system is placed. The digitized system provides an inexpensive means by which conventional inexpensive computer devices can be used.

BRIEF DESCRIPTION OF THE DRAWINGS

The invention will now be described with reference to the accompanying drawings in which.

DESCRIPTION OF THE PREFERRED EMBODIMENT

Figure 1:
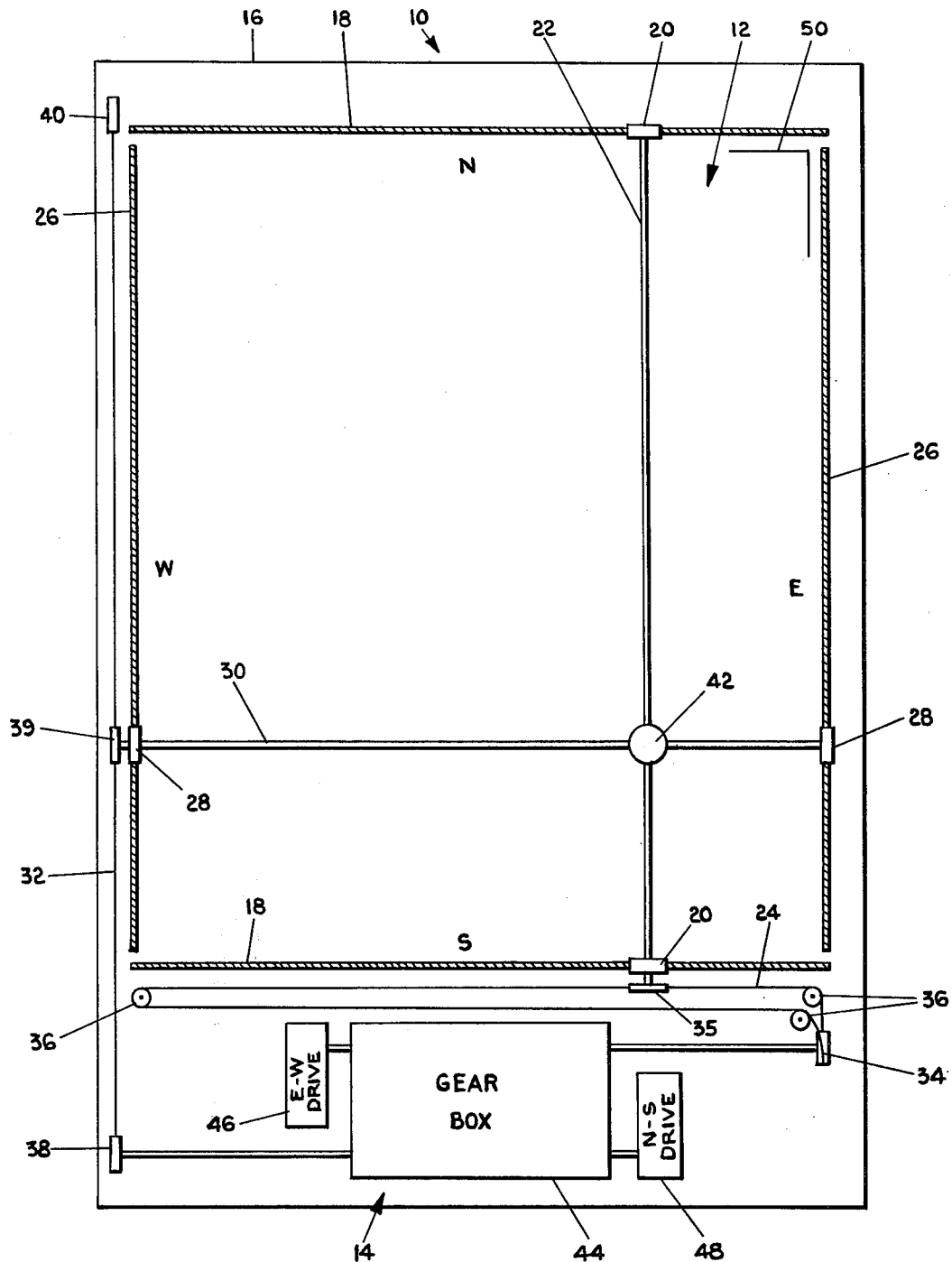
FIG. 1 is a plan view of a plotter according to the invention.

Referring now to the drawings and to FIG. 1 in particular, there is shown a display unit 10 comprising an indicating unit 12 and a drive unit 14 for plotting a course of a vehicle on a chart 50 as the vehicle travels from place to place.

The indicating unit 12 has an east-west plotter beam 22, a north-south plotter beam 30, and a scriber 42 mounted on the plotter board 16 for scribing a line on a chart 50. The east-west plotter beam 2 is mounted on a pair of east-west rack gears 18 by means of pinion gears 20. The east-west rack gears 18 are mounted on the plotter board 16, spaced a convenient distance apart, parallel to each other and secured to the plotter board 16 by screws or other conventional fasteners (not shown). The north-south plotter beam 30 is mounted on a pair of north-south rack gears 26 by means of a pair of pinion gears 28. The rack gears 26 are mounted near the outer edge of the plotter board 16 parallel to each other and 90° to the east-west rack gears 18. The rack gears 26 are secured to the plotter board 16 by screws or other conventional fasteners (not shown).

The scriber 42 contains means such as a pen or pencil for scribing a line on a chart and is slidably mounted on each of the plotter beams 22 and 30 for movement therewith for scribing a line on a chart 50. The scriber 42 moves north and south with the north-south plotter beam 30 and moves east and west with the east-west plotter beam 22.

The drive unit 14 has a gear box 44, a north-south drive motor 48, an east-west drive motor 46 and connecting pulleys and cables for driving the two plotter beams. The drive motor 46 is a variable speed reversing DC motor connected to a power supply through an on-off switch which is actuated from an external source to be explained later. Alternately, the motor 46 can be a stepping motor which drives an output shaft a predetermined angular distance for each pulsed input.

The east-west drive motor 46 drives pulley 34 through a reduction gear train contained in gear box 44. A cable 24 is wound on the pulley 34, on guide pulleys 36 and wound around beam pulley 35 on one end of the east-west plotter beam 22. The rotation of the pulley 34 rotates pulley 35 to rotate pinion gears 20 of the east-west plotter beam 22.

The north-south drive motor 48 is a variable speed motor connected to a power supply through an on-off switch (not shown in FIG. 1) which is actuated from an external source to be explained later. The motor 48 drives pulley 38 through a reduction gear train contained in the gear box 44. A cable 32 is wound on the pulley 38, on guide pulley 40 and wound around north-south plotter pulley 39 on the end of the north-south plotter beam 30. The rotation of the pulley 38 causes rotation of the pulley 39 for movement of the north-south plotter beam 30. The scriber 42 is slidably mounted at the intersection of the plotter beams 22 and 30 for longitudinal or latitudinal movement on the board. A movement of either the north-south or the east-west plotter beams causes a corresponding movement of the scriber 42. A movement of the scriber unit causes a line to be traced on the chart 50 simulating the path of travel of the vehicle on reduced scale on the chart.

Figure 2:
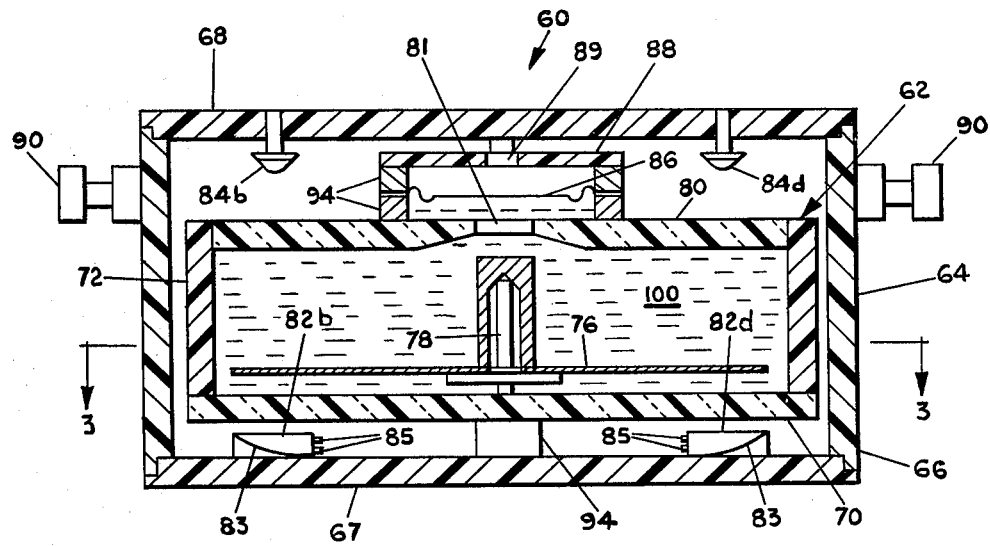
FIG. 2 is a side elevational view in section of a magnetic compass and means for detecting the heading of the compass according to the invention.

Referring now to FIG. 2, the direction sensor 60 has a magnetic compass 62 for indicating magnetic direction in accordance with the conventional magnetic compass techniques. The sensor 60 is installed into a craft or vehicle so that when the craft is facing in a given magnetic direction the compass indicates the same direction. The magnetic compass 62 is encased in a housing 64 for mounting in a vehicle. The housing 64 has a tubular wall 66 and a bottom wall 67 enclosing one end. A pair of trunnions 90 are secured to the outer surface of the wall 66 at the upper end at 180° to each other for mounting the direction sensor 60 in a gimbal. A cover 68, containing four photocells 84a, b, c and d located in quadrants of the cover closes the upper end of the housing. The sensitive ends of the photocells are directed inwardly for sensing light below each quadrant. Four light bars 82a, 82b, 82c and 82d, shielded at the sides to direct light only in an upward direction, are secured to the inner surface of the base wall 74 in each quadrant of the base 67 in line with the photocells 84a, 84b, 84c and 84d, respectively.

Each of the light bars 82a, 82b, 82c and 82d are formed from a bottom generally concave reflecting surface 83 and one or more light emitting diodes 81. The reflector 83 is shaped to provide a substantially uniform distribution of light along the top surface of the light bar. Desirably the top surface of each light bar is coated to more evenly diffuse the light.

The magnetic compass 62 has a magnetic disc 76 for indicating magnetic north in accordance with the conventional magnetic compass techniques. The magnetic disc 76 is pivotably mounted on a pivot pin 78 so that the magnetic disc 76 can swing freely about the stem 78. The magnetic disc 76 is desirably mounted in a fluid and enclosed in a sealed unit formed by transparent base plate 70, opaque tubular ring 82 and clear upper plate 82. The pivot pin 78 extends upwardly from the sensor unit base plate 70. The sensor unit base plate 70 is desirably made of a clear thermoplastic acrylic resin to permit light to pass therethrough. The opaque tubular ring 72 is nonmetallic and is securely bonded to the base plate 70, forming the sides of the compass assembly 62. The upper plate 80 is made of a clear thermoplastic acrylic resin and is bonded to the upper inner wall at the upper edge of the tubular ring 72. The plate 80 has an opening 81 with a tapered edge extending inwardly forming the opening for a bubble trap. The cavity in the housing is filled with a low viscosity fluid 100 for damping the movement of the compass card 76. A pair of annular spacers 94 with a diaphragm 86 sandwiched therebetween is securely attached to the upper plate 80 and forms the bubble trap. A cover plate 88 on the spacers 94 has a hole 89 therethrough which allows the diaphragm 86 to compensate for temperature and pressure changes.

Figure 3:
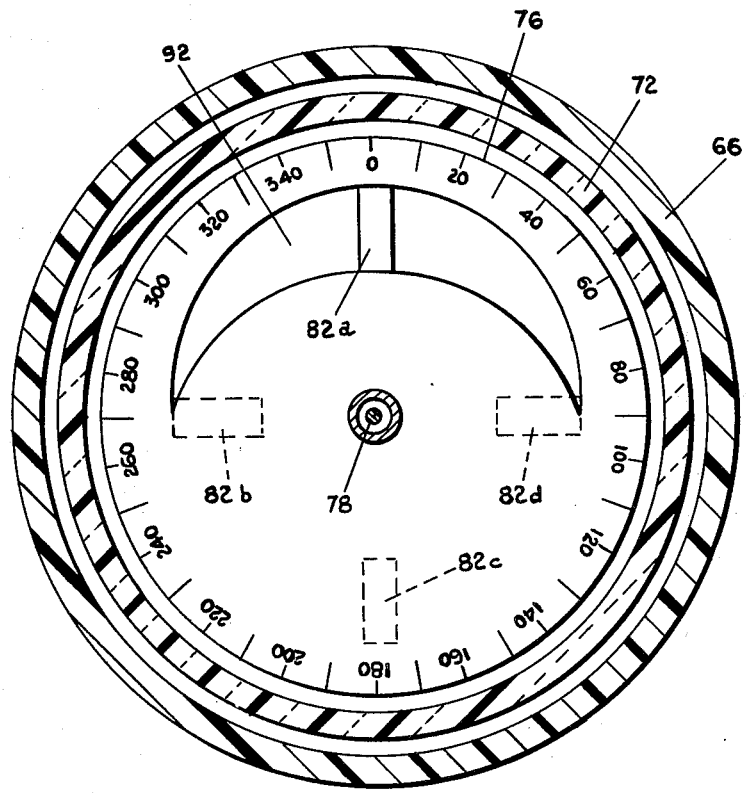
FIG. 3 is a sectional view through lines 3—3 of FIG. 2.

The magnetic card 76 is graduated as shown in FIG. 3 in the units of degrees between the quadrants for visually displaying the directions from magnetic north. The magnetic card 76 contains a crescent-shaped cutout 92 which is positioned with the greatest width of the crescent directly in line with the 0° marking. The tips of the crescent extend toward the east-west centerline and terminate at about 90° and 270°. The width of the slot is generally a cosine function of the angle on the card 76 between 270° to 0° and 0° to 90°.

When the light bars 82a, 82b, 82c and 82d are illuminated, the rotation of the magnetic card 76 causes one or two of the photocells 84a – 84d to receive a quantum of light which is a function of the position of the compass card 76. As the compass card 76 rotates, the photocells either receive more light through the crescent opening 92 or the light is diminished by the width of the opening or is blocked out completely by the solid portion of the card.

As shown in FIG. 3, when the compass card 76 indicates a northerly direction, the north photocell 84a receives the light from the light bar 82a and will generate a signal indicating a northerly direction. As the compass card 76 rotates in a clockwise direction so that the compass card 76 indicates a northwesterly direction, both the north and west photocells 84a and 84d receive light and generate signals representative of the amount of light received by each of the photocells.

Figure 4:
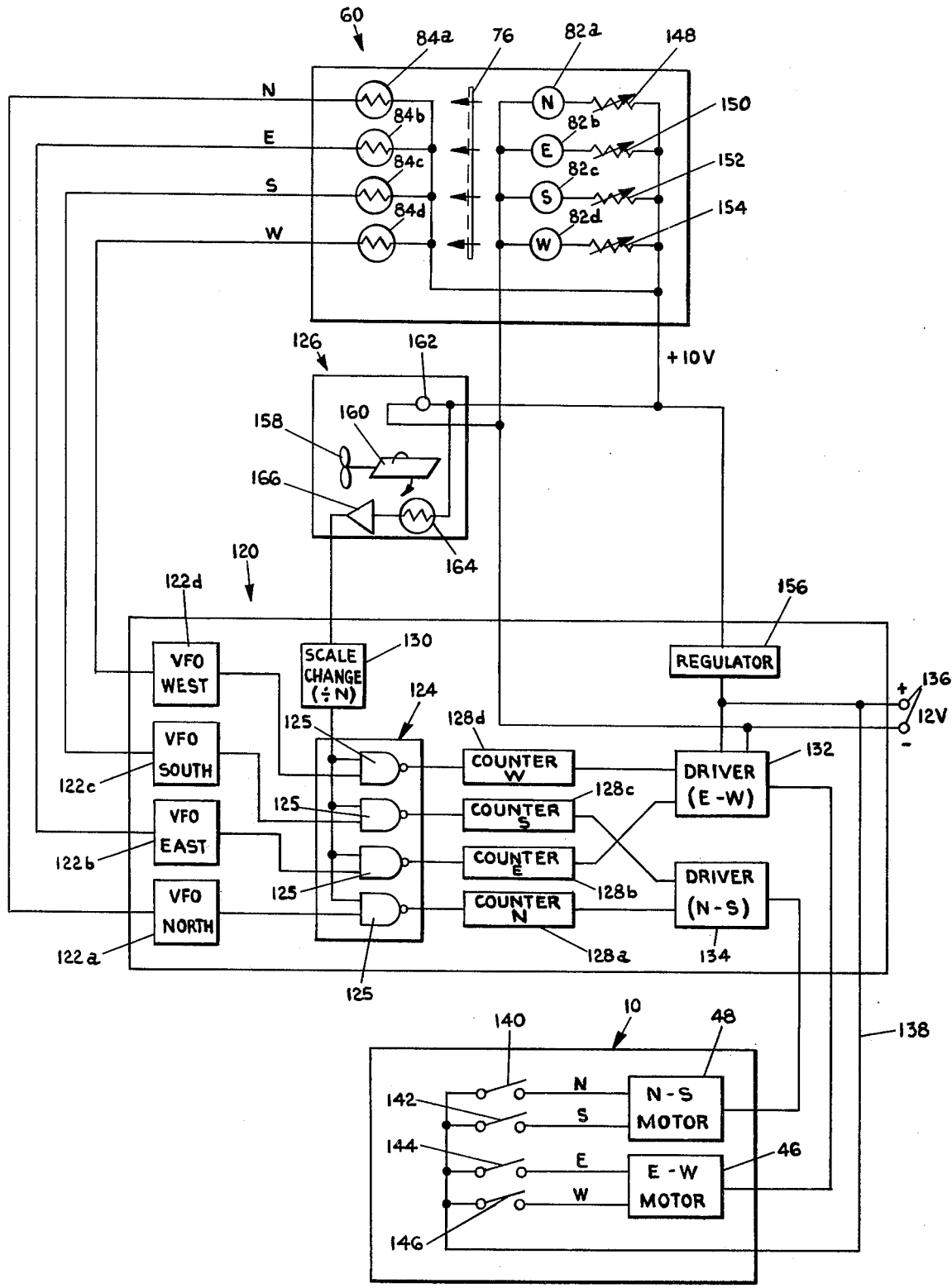
FIG. 4 is schematic electrical diagram of the navigation system according to the invention.

Referring now to FIG. 4, wherein the navigation system is shown schematically in block form, the direction sensor 60 has outputs N, E, S and W from the respective photocells 84a, 84b, 84c and 84d (two of which are illustrated in FIG. 2). As seen in FIG. 4, adjustable potentiometers 148, 150, 152 and 154 are provided for the light sources 82a – 82d to equalize the lighting for each of the light sources. The outputs N, E, S and W are connected to a computer 120 which converts the signals from the photocells to a frequency which is proportional to the light received by each photocell. The computer 120 is comprised of variable frequency oscillators 122a, 122b, 122c and 122d, a sampler 124, a scale or divider 130, counters 128a, 128b, 128c and 128d, and drivers 132 and 134. The variable frequency oscillators 122a – 122d convert each input into an output signal having a frequency proportional to the amplitude of the input signal. The frequency of the output signal is proportional to the cosine of the angle between the cardinal direction (N, S, E or W) and the heading of the craft or vehicle. The variable frequency oscillators are conventional oscillators which deliver a frequency output proportional to a resistance input. An example of a variable frequency oscillator of this nature is an NE 555 or 8038 oscillator sold by Intersil.

The sampler 124 has a plurality of NAND gates 125 which permit passage of the signals from the VFO oscillators 122a – 122d when a pulse is applied thereto by the scale 130. The scale 130 is a circuit which produces a pulsed output of a given duration for each set of a given number of input pulses. For example, the scaler can be comprised of a plurality of serially connected counters which are also connected through appropriate thumbwheel switches and gates to a one-shot variable pulse circuit. Such circuits are well known to those skilled in the electronics art. The scaler is desirably adjustable by factors of 10 to change the frequency at which the sampling takes place. Means are provided in the scaler for resetting the counters at zero each time a sample pulse is generated thereby.

A distance measuring device 126 measures the distance traveled by the craft or vehicle and provides a pulsed output signal proportional thereto. The distance measuring device provides output pulses proportional to the distance the craft has traveled. For example, the distance measuring device comprises an idler propeller 158 which is positioned in the water alongside the craft. The propeller 158 is connected to a card 160 which rotates with the propeller. A light source 162 is provided on one side of the card 160 and a photocell 164 is provided on the other side of the card 160. Each time the propeller rotates through 180°, the photocell will register a pulse which is amplified by amplifier 166 and applied to the scale 130. Thus, the distance measuring device generates an output signal for each given unit of distance traveled by the craft. In case of a land vehicle, an output signal can be provided by a similar pulse generating device for each turn of a speedometer cable.

The counters 128a – 128d receive the output signals from the NAND gates 125 to count the pulses in each of the output signals. After a predetermined number of counts are received by any of the counters, that counter will generate a pulse signal which is applied to the driver 132 or 134, as the case may be. The driver 132 is adapted to drive the drive motor 46 and the driver 134 is adapted to drive the drive motor 48 upon receipt of an input pulse from one of the counters 128a – 128d. The counters are well known components which count pulses and produce an output signal when a predetermined number of pulses have been counted. An output signal of one polarity from the driver 134 drives the north-south drive motor 48 in one direction and an output signal of another polarity from the driver 134 drives the north-south drive motor 48 in an opposite direction. An output signal of one polarity from the driver 132 drives the east-west drive motor 46 in one direction and an output signal of another polarity from the driver 132 drives the east-west drive motor 46 in an opposite direction. Thus, the signals from the drivers 132 and 134 drive the scribe unit 48 in north, south, east and west directions. Manual switches 140, 142, 144 and 146 are provided to drive the N-S motor 48 and the E-W motor 46 for initial positioning of the scriber 42.

Figure 5:
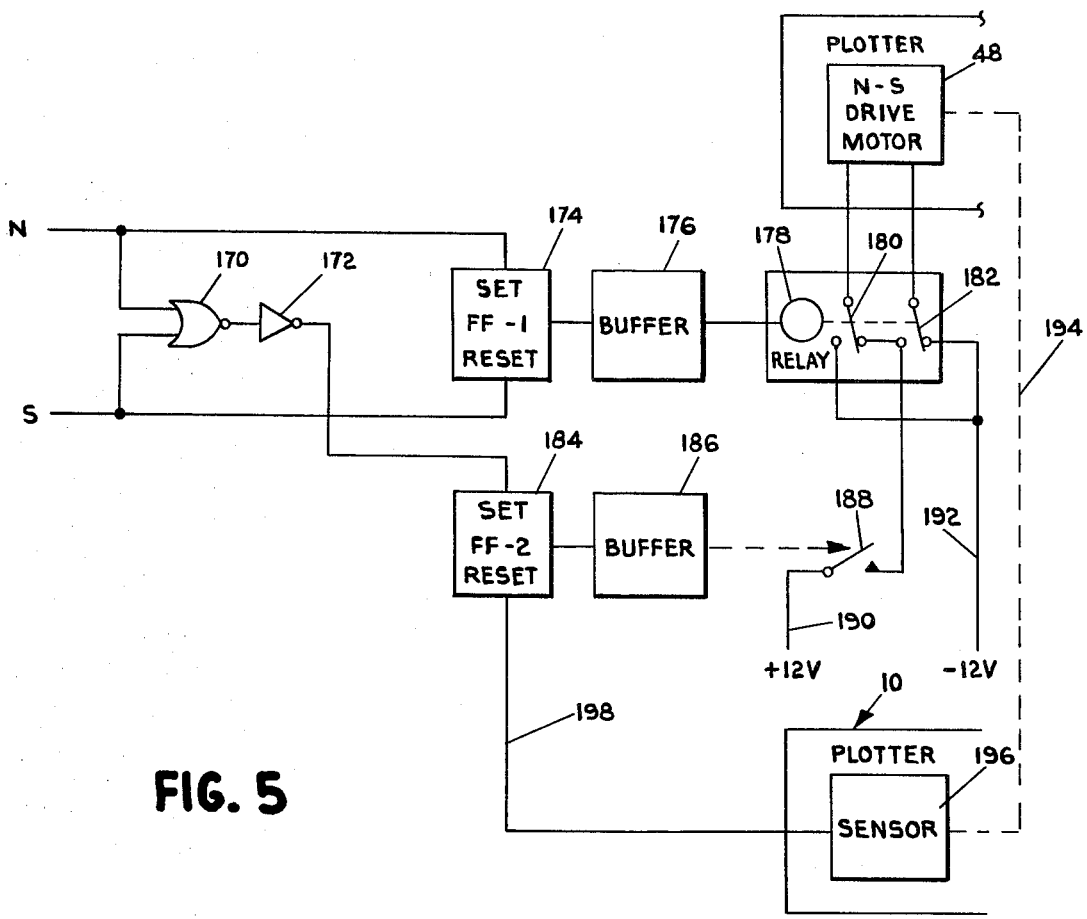
FIG. 5 is a schematic electrical diagram of a north-south drive unit illustrated in block form in FIG. 4.

Reference is now made to FIG. 5 which shows in schematic form the driver circuit 134 illustrated in block form in FIG. 4. Driver 132 is of identical configuration and for purposes of brevity will not be shown.

The driver 134 comprises a NOR gate 170 connected between the north and south inputs from the counters 128a and 128c. The output from the NOR gate is coupled to a flip-flop 184 through an inverter 172. The inputs from the counters 128a and 128c are applied to a flip-flop 174, the output of which is applied to a relay 178 through a buffer 176. The relay 178 controls the position of the switch contacts 180 and 182 which are connected to the drive motor 46. When the switch contacts 180 and 182 are in one position, the drive motor 48 can be driven in one direction and when the switch contacts are in the other position the drive motor 48 can be driven in the opposite direction.

The flip-flop 184 is connected to a transistor switch 188 through a buffer 186 to control the current flow to the drive motor 48. A plus 12-volt input 190 is connected to the transistor switch 188 for applying a 12-volt input to two of the poles of the switches 180 and 182. A negative 12-volt input 192 is connected to two other poles of the switches 180 and 182 to apply a potential of opposite polarity to the drive motor 48.

The drive motor 46 is coupled through a gear train 194 to a sensor 196 which detects the drive motor rotation. Each rotation of the gear train results in an output pulse which is applied to the flip-flop 184 through lead 198. The senor 196 can be an optical sensor, as for example, a photocell which detects the rotation of a shaft in a manner similar to that shown for the distance device 126, or can be an electromechanical sensor wherein a contact or microswitch is actuated by a cam upon revolution of a shaft.

In operation of the driver illustrated in FIG. 5, an input on the N lead from counter 128a is applied to flip-flop 174, buffer 176 and relay 178 to position the switches 180 and 182, for example, in the manner illustrated in FIG. 5. The input is also applied through NOR gate 170 and inverter 172 to the flip-flop 184 which actuates the transistor switch 188. The motor 46 will thus be driven in one direction until such time as a given signal is sensed by the sensor 196. The output from the sensor 196 resets the flip-flop 184 to release the transistor switch 190, thereby stopping the motor.

A signal from the S input from counter 128c will drive the transistor switch in the same fashion. However, the S input will reset the flip-flop 174 to actuate the relay 178 to move the switches 180 and 182 to the other contacts. Thus, the motor will be driven in an opposite direction.

In operation, the direction sensor 60 is mounted in a craft or vehicle and the compass disc 76 will rotate until the card indicates a proper north direction. One or more of the photocells 84a – 84d will receive light from the light bars 82a – 82d through the crescent-shaped opening 92 in the compass disc 76. For purposes of description, the photocells will be termed north, east, south and west. The north photocell 84a will be aligned with the north heading on the compass disc when the craft or vehicle is headed in a northerly direction. The east, south and west photocells 84b, 84c and 84d will likewise be aligned with the east, south and west directions respectively on the compass disc 76 when the boat is headed in a north direction. Thus, the direction sensor 60 is mounted in the craft or vehicle such that a line passing through the north and south photocells 84a and 84c is a line in a direction parallel to the bow of the boat.

Assuming that the craft is oriented in a northerly direction, the compass disc 76 will be positioned as shown in FIG. 3 with the north photocell 84a being aligned directly with the north direction or 0° of the card. This direction represents the maximum slit width for the crescent-shaped opening 92 and thus a maximum amount of light from the light bar 82a beneath the north photocell 84a will be received by the north photocell 84a. At the same time, substantially no light will be received from the east, south and west photocells 84b, 84c and 84d.

The outputs from the north, east, south and west photocells are applied to the variable frequency oscillators 122a – 122d. However, the outputs from the east, south and west photocells 184b, 184c and 184d are substantially zero. The output from the north photocell 84a will be converted into a frequency which is representative of the amplitude of the signal. Desirably, the crescent-shaped opening 92 is shaped such that the output from the variable frequency oscillator 122a is a cosine function of the position of the compass disc 76 with respect to the north heading of the craft. Thus, the crescent-shaped opening 92 compensates for any non-linearities in the photocells and the variable frequency oscillators.

Figure 6A:
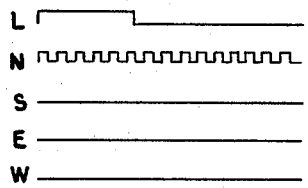
FIGS. 6a, 6b and 6c are schematic representations of signals from various components of the navigation system when the craft or vehicle is headed in a northerly direction.
Figure 6B:
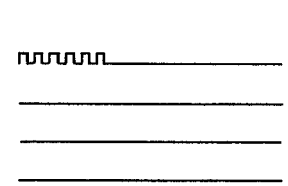

The outputs from the variable frequency oscillators 122a – 122d are represented in FIG. 6a which is a graph of the output from the distance measuring device 126 and from the variable frequency oscillators 122a – 122d. Curves N, S, E and W represent the outputs from the variable frequency oscillators 122a, 122d, 122b and 122d respectively, and L represents the output from the scale 130. As seen in FIG. 6a, the N output from the variable frequency oscillator 122a shows a square wave pattern of a given frequency. The S, E and W outputs of the oscillators 122c, 122b and 122d show no signals. When the craft or vehicle is stationary, the output from the scale 130 would be zero. However, when the craft or vehicle is moving, the scale 130 will deliver a pulse signal such as illustrated in curve L in FIG. 6a. This signal from scale 130 is applied to the sampler 124 to gate the signals from the variable frequency oscillators. The output from the sampler 124 is shown in FIG. 6b. The sampler has N, S, E and W outputs representing the N, S, E and W inputs from the variable frequency oscillators 122a, 122c, 122b and 122d, respectively.

During the period of time at which the signal from the scale 130 is applied to the sampler, the signals from the variable frequency oscillator will be gated to the counters 128a – 128d. Thus, FIG. 6b shows that a certain number of pulses will be applied to the counter 128a from the variable frequency oscillator 122a during the time interval during which the scale 130 signal is applied to the sampler 124. Since the S, E and W inputs are zero to the sampler, the corresponding outputs therefrom will be zero.

Figure 6C:
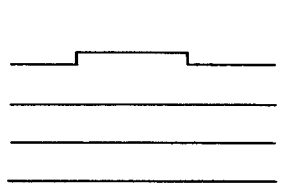

The pulses are counted in the counters 128a – 128d. After a predetermined number of pulses are counted in any of the counters, an output signal is generated from the counter. In our example, during the unit of the gated signal, the pulses counted equal the predetermined number of pulses to provide an output from the counter 128a. Curve 6c represents the output from the counter 128a – 128d. As seen in FIG. 6c, a signal is provided for the N output from counter 128a. The signal is applied to the north-south driver 134 which drives the motor 48 of the display unit 10 to drive the north-south plotter beam 30. The signal is applied for a predetermined time to the north-south drive 48 so that the plotter beam 30 is moved through a unit distance. Thus, for example, a signal from the N output from the counter and driver 128 would move the pulley 39 of the north-south plotter beam 30 through a given angular rotation.

Since the east, south and west outputs from the counter and driver are zero in this particular example, no other signals would be applied to the drive motors 46 or 48 of the display unit 10.

If the craft were turned to the east, the same results would be obtained except that the east output from the counter 128b would be one unit and the outputs from drivers 128a, 128c and 128d would be zero. Similar results are obtained for the south and west outputs from the counters 128c and 128d when the craft or vehicle is traveling in southerly and westerly directions.

Figure 7A:
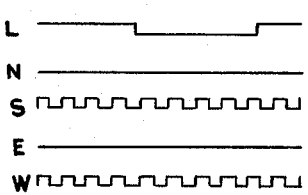
FIGS. 7a, 7b and 7c are schematic representations of the signals from various components of the plotter when the craft or vehicle is heading in a southwesterly direction.

When the vehicle or craft is moving in a direction between two of the poles, then two of the photocells will be receiving light but at an attenuated level from that when the craft is heading purely in a north, south, east and west direction. Assuming that a craft is heading in a southwesterly direction, attenuated light will be received from the south and west photocells which will generate signals representative of the angular degree between the craft direction and true south and true west. The output from each of the photocells 84c and 84d will approximate the intensity of the full light when the craft is heading in the cardinal direction reduced by the cosine of 45°. The variable frequency oscillators 122c and 122d convert the signals from the south and west photocells 84c and 84d to frequencies which are representative of the input signals. FIG. 7a represents the output of the signals from the variable frequency oscillators 122a – 122d. As seen in FIG. 7a, the outputs from the oscillators 122c and 122d are at an equal frequency which is less than the frequency of the north oscillator 122a as shown in FIG. 6a. The frequency of the oscillators 122c and 122d in this example would be attentuated by a factor equal to the cosine of 45° with respect to the frequency of oscillator 122a in the first example.

Figure 7B:
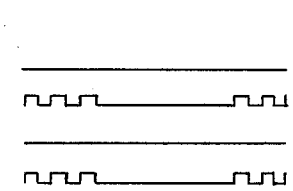
Figure 7C:
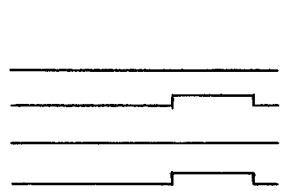

After the craft or vehicle moves a given distance, the distance measuring device 126 will gate the sampler 124 for a predetermined period of time. The outputs from the sampler 124 are illustrated in FIG. 7b. As seen in FIG. 7b, fewer pulses are generated during the sample interval in FIG. 7b than in FIG. 6b. Thus, the counter takes longer to read the predetermined number of pulses before it drives the display unit drive motors. This fact is illustrated in FIG. 7c. The counters 128c and 128d will apply a signal to the drivers 134 and 132 when the predetermined number of pulses is reached in each counter.

When the signals are generated from the counters 128c and 128d, the drive units of the display board are moved through one unit. For example, the output signal from the counter 128c will actuate the drive 134 to cause the drive motor 48 to drive the plotter beam 30 one unit in a southerly direction. At the same time, the output from the counter 128d will actuate the driver 132 to drive the drive motor 46 to move the east-west plotter 22 in a westerly direction through one unit.

In the event that the craft is heading in a direction which is not equally between the north, south, east or west directions, then the drive units 46 and 48 are driven at different times. Each of the units is driven in the headed direction one unit at the time that the counter counts the predetermined number of pulses. Thus the scriber moves in a step-type of pattern which is relatively small if the sampling takes place at a relatively high rate.

The invention provides a means for electronically determining the heading of a compass and for driving a plotter responsive thereto. No expensive repeating motors are required for driving potentiometers to first obtain the correct compass heading. The photocell system provides a direct readout of the compass heading. The invention integrates the distance with the direction electronically to give an output for the plotter for each direction.

With the invention, the scale can be easily changed and the chart can be plotted on a transparent material with a map lying beneath the same simply by changing the rate at which sampling takes place.

Whereas the invention has been described with reference to a plotting board wherein a pulley on a rack is used to move the plotting beam, other plotting systems can be used. For example, a threaded rod which drives a nut on the plotter beams can be used in lieu of the pulley system.

The invention finds primary use in watercraft but can be equally used in land vehicles and aircraft. For purposes of this description and as used in the appended claims, the term "vehicle" is intended to be generic to water, land and air vehicles.

Whereas the invention has been described with reference to a visual display unit which includes a plotting board, the invention can be used with or without an automatically driven plotting board. For example, a visual counter can be used to indicate digitally the movement in each direction from a starting location. The digital information can be used at any time to ascertain the position of the craft on a chart.

The invention will be primarily used in a vehicle to give the position of the vehicle. However, the system can also be used with a transmitter, for example, to plot the coordinate position at a distance from the vehicle. With this system, one can thus keep track of water, land and air vehicles from a central location.

Reasonable variation and modification are possible within the scope of the foregoing disclosure and drawings without departing from the spirit of the invention which is defined in the accompanying claims.

The embodiments of the invention in which an exclusive property or privilege is claimed are defined as follows:

1. A navigation system for determining the position of an air, land or water vehicle with respect to a given set of coordinates, said system comprising:
    means for measuring the heading of said vehicle with respect to two intersecting directions and for generating output signals representative of the vehicle heading in each of said two directions;
    a distance measuring means mounted on said vehicle to measure the distance traveled by said vehicle and to produce an output sample signal of a given duration for each unit of distance traveled by said vehicle;
    means to gate each of said vehicle heading signals when an input pulse is applied thereto;
    means for applying said sample signal from said distance measuring means to said gate means so that said vehicle heading signals are gated for a given duration each time a vehicle travels a predetermined distance;
    first means for summing a first gated signal from said gating means;
    means for producing a first directional command signal each time the sum of said first gated signals reaches a predetermined value;
    second means for summing a second gated signal from said gating means;
    means for producing a second directional command signal each time the sum of the second gated signals reaches a predetermined value;
    visual indicator means for visually indicating the position of said vehicle with respect to a given set of coordinates, said indicator means including means coupled to said first directional comamand signal producing means for counting the number of signals generated and for visually indicating the number of said first directional command signals; and;
    means coupled to said second directional command signal producing means for counting the number of signals generated thereby and for visually indicating the number of said second directional command signals.

2. A navigation system according to claim 1 wherein said heading measuring means comprises means for generating a directional signal representative of the vehicle heading with respect to two of four directions which are angularly spaced 90° from each other.

3. A navigation system according to claim 2 wherein each of said directional signals is substantially a cosine function of the deviation of said vehicle from one of said directions.

4. A navigation system according to claim 3 wherein said heading measuring means comprises:

a magnetic compass card responsive to the magnetic field of the earth, said compass card having a crescent-shaped opening disposed angularly on said card, said crescent-shaped opening having a width which generally follows a sine function between 0° and 180°;

means mounting said compass card for rotation about a vertical axis of rotation;

linear light sources positioned on one side of the plane of said card, said light sources being spaced at 90° from each other about the axis of rotation of said compass card and being radially disposed with respect to the axis of rotation of the compass card, said light sources being aligned with said crescent-shaped openings in said compass card;

photometric detecting means positioned on an opposite side of the plane of the compass card from the light sources, each photometric detecting means being aligned with one of said light sources to detect light therefrom when said crescent-shaped opening is therebetween.

5. A navigation system according to claim 4 wherein the width of said opening is further selected to compensate for nonlinearities of said photocells.

6. A navigation system according to claim 4 wherein the width of said opening is further selected to compenste for nonlinearities of said heading measuring means.

7. A navigation system according to claim 6 wherein said heading measuring means includes means to convert output signals from said photocells to a frequency representative of the magnitude of said signals.

8. A navigation system according to claim 7 wherein said first and second summing means count the pulses of said first and second gated signals.

9. A navigation system according to claim 1 wherein said heading measuring means includes means for generating signals having a frequency representative of the vehicle heading in each of said two directions and said first and second summing means count the pulses of said first and second gated signals.

10. A navigation system according to claim 9 wherein said distance measuring means includes pulse generating means for generating a pulse signal when said vehicle has traveled a predetermined distance, means for counting said pulse signals and means for generating said output sample signals when a predetermined number of said pulses have been counted by said pulse counting means, and means for resetting said pulse counting means at zero after each output sample signal is generated.

11. A navigation system according to claim 1 wherein said distance measuring means includes pulse generating means for generating a pulse signal when said vehicle has traveled a predetermined distance, means for counting said pulse signals and means for generating said output sample signals when a predetermined number of said pulses have been counted by said pulse counting means; and means for resetting said pulse counting means at zero after each output sample signal is generated.

12. A navigation system according to claim 1 wherein said means for counting the number of said signals generated by said first and second direction command signal producing means is a plotter for plotting north-south and east-west directions on a map.

* * * * *